Jan. 29, 1935.  L. E. LA BRIE  1,989,202

BRAKE

Filed Oct. 30, 1929

INVENTOR.
LUDGER E. LA BRIE
BY
ATTORNEY

Patented Jan. 29, 1935

1,989,202

UNITED STATES PATENT OFFICE 1,989,202

BRAKE

Ludger Elizé La Brie, South Bend, Ind., assignor to Bendix Brake Company, South Bend, Ind., a corporation of Illinois Application October 30, 1929, Serial No. 403,371

9 Claims. (Cl. 188—78)

This invention relates to brakes and is illustrated as embodied in an internal expanding two shoe brake for motor vehicles.

One object of this invention is to provide an anchor for the shoes adapted to hold them in proper relation to each other and to the brake drum and at the same time permit the sliding action necessary to their expansion against the drum. Although various forms of sliding anchors have been known before, they have been subject to various disadvantages. For example, anchors which were otherwise satisfactory failed to keep the shoes properly aligned thus allowing one shoe to press against the drum more than the other. This invention overcomes this difficulty by the provision of a pivot slidable on the anchor.

Another object of the invention is to provide an anchor which may be adjusted to aid in the application of the brake and to provide a sliding anchor in which the sliding parts have contact surfaces sufficiently large to avoid undue wear.

Other objects and advantages will appear from the following description.

In the drawing, in which some of the embodiments of this invention are illustrated:

Figure 1:
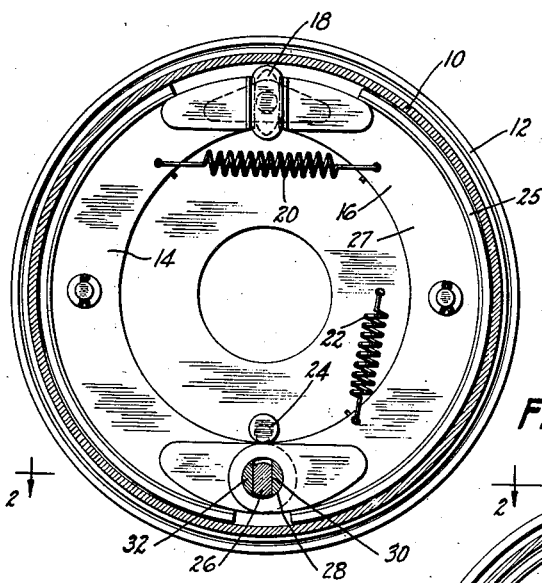
Figure 1 is a view partly in section of one embodiment of the invention.

In each of the embodiments illustrated, the brake mechanism is supported within a brake drum 10 by a backing plate 12. The mechanism consists preferably of two shoes 14 and 16 adapted to be spread apart by a cam 18 or other suitable mechanism operated by means not shown. When the brake is released, the shoes are held clear of the drum by springs 20 and 22 and when in this position may be adjusted in any suitable manner, as by the eccentric 24. The shoes include a friction face 25 and a web 27. The webs 27 are provided with transverse bores 28 through which extends an anchor 26.

Figure 2:
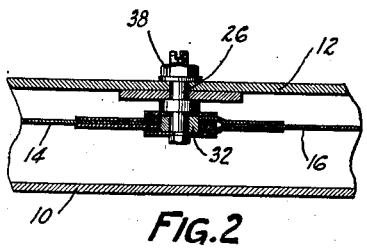
Figure 2 is a fragmentary view in cross section on the line 2—2 of Figure 1.

In the operation of any brake, the drum has a tendency to turn the shoes in the direction of the drum rotation. One problem which has always confronted brake designers is the mounting of the shoes with respect to the anchor in such a way that the shoes could be given the desired radial movement and would still be restrained from the undesired circumferential movement. This problem has been solved in the present invention by making the anchor 26 smaller than the bores 28 in the brake shoe and flattening the sides of the anchor as at 30. Positioned on the flattened sides of the anchor are segments 32 the flat faces of which co-act with the anchor and their cylindrical faces fit snugly in the bores 28, thus forming a sliding pivot for the shoes. Each of the segments extends through both of the brake shoes, as shown in Figure 2. The segments are preferably of such size that there will be no play about the anchor transversely of the segments, while the shoes with the segments may slide longitudinally of the anchor, that is, radially of the drum.

Since the segments are held fully apart by the anchor 26, the shoes will be held properly aligned, though pivotally connected. If desired, the segments may be joined top and bottom, or may have contacting projections forming a hollow cylindrical pivot slidable upon the anchor. This would have the advantage that the shoes would be held in proper relation, even though such cylindrical member did not fit tightly about the anchor. In either case, it may be said that the shoes pivot about the segments which are slidable on the anchor.

Figure 3:
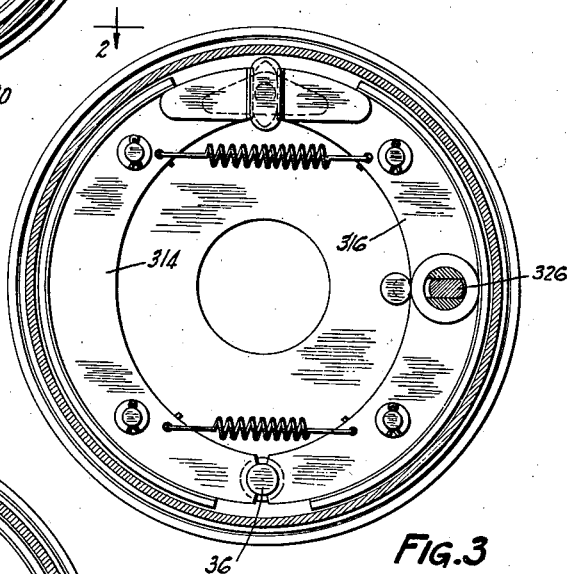
Figures 3 and 4 are views partly in section of two other embodiments of the invention.

In Figure 3 the anchor 326 is located in the middle of one shoe, while the two shoes are pivoted as at 36, the pivot being free to move with the shoes. This construction has the advantage that when the drum is rotating in the counter-clockwise direction the shoe 314 has a full servo effect on the shoe 316. The anchor may of course be located at any desired point.

Figure 4:
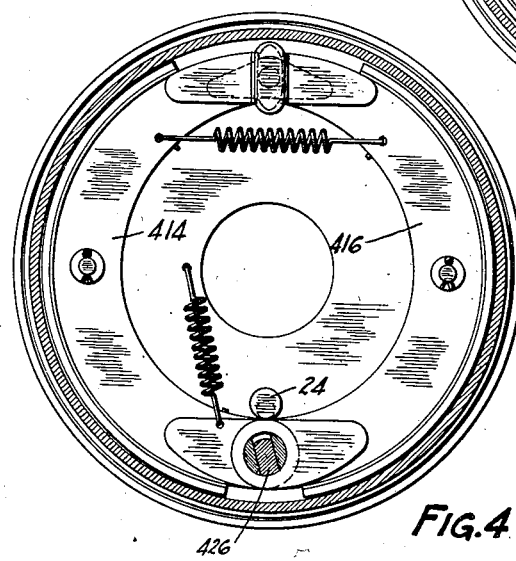

In Figure 4 the anchor 426 is located at the juncture of the shoes, as in Figure 1, and is turned at an angle so that the shoe 414, when rotated in the counterclockwise direction, would be thrust outwardly against the drum by the anchor. This would increase the braking effect of the shoe 414. In the reverse direction, the anchor would act as any fixed anchor, since sliding toward the center will be limited either by the anchor itself or by an eccentric adjustment 24. As shown in Figure 2, the anchor is held to the backing plate by a nut 38, and may be turned at any desired angle upon loosening of this nut. To facilitate such adjustment a slot may be provided at the outer end of the anchor member.

Figure 5:
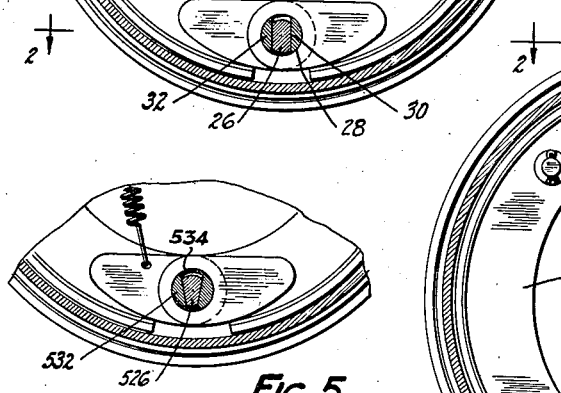
Figure 5 is a fragmentary view partly in section of a third embodiment of the invention.

In Figure 5, the anchor 526 has the two flattened sides at an angle instead of parallel to each other. With this construction the operation is the same in either direction, tending to thrust the shoes against the drum. The segments 532 are joined by upper and lower integral webs 534, a construction which is especially desirable in this embodiment, since otherwise upon actuation of the brake the anchor will cease to hold the segments properly spaced. The two segments 532 and their webs 534 form a hollow cylinder. It will be noted that in all the embodiments of the invention the flattened sides of the anchor are at acute angles to the radii of the drum passing therethrough.

The operation of the brakes is as follows: Upon rotation of the cam 18 the two shoes are spread apart, usually contacting first with the drum near the cam 18. Upon further rotation of the cam 18 and under the influence of the rotating brake drum the shoes shift their position on the anchor 28 until they contact with the brake drum throughout their length. The rotation of the drum aids this shifting as to one shoe but opposes it as to the other. The segments 32, however, keep the shoes properly aligned although permitting pivotal action between the shoes, thus insuring equal action of the two shoes. The anchor also takes the braking torque preventing rotation of the shoes, and in some embodiments uses this torque to thrust the shoes against the drum.

While several illustrative embodiments have been described in detail, it is not my intention to limit the scope of the invention to those particular embodiments or otherwise than by the terms of the appended claims.

I claim:

1. A brake, including a brake drum, a backing plate, a brake shoe suspended within the drum, an anchor for the brake shoe, said anchor being flattened on one side, and a segment contacting with the flattened side of the anchor and with the brake shoe, the plane of the flattened side being at an acute angle to the radius of the drum passing through the anchor.

2. A brake, including a drum, a backing plate for said drum, and a pair of brake shoes within said drum, one of said shoes being slidably anchored to the backing plate near the center thereof and the other of said shoes being anchored only by a pivotal connection to the first-mentioned shoe.

3. Braking mechanism including a fixed anchor having a flat intersecting at an acute angle the drum radius passing through the center of the anchor, a pivot slidable on the flat and a brake shoe pivoted on the pivot.

4. A brake mechanism comprising a drum, a backing plate associated with the drum, an anchor fixed to the backing plate and having two flat surfaces, a brake shoe having a friction face and a web, said web having a transverse bore receiving the anchor, and separate segments within the bore contacting with said surfaces and with the wall of the bore, at least one of said surfaces intersecting a radius of the drum at an acute angle.

5. A brake anchor having two flat sides, a shoe having a friction face and a web, the web having a transverse bore receiving said anchor, the anchor being smaller than the bore, and a pair of separate segments each having a flat face engaging one flat side of the anchor and a cylindrical surface engaging the inside of said bore.

6. A brake anchor having two flat sides, a shoe having a friction face and a web, the web having a transverse bore receiving said anchor, the anchor being smaller than the bore, and a pair of separate segments each having a flat face engaging one flat side of the anchor and a cylindrical surface engaging the inside of said bore, the flat sides of the anchor being in planes which meet at an angle.

7. A brake comprising a pair of articulated shoes, at least one of which has at an intermediate point in its length an anchor opening extending entirely therethrough, and an anchor extending through said opening, said anchor and said opening being constructed and arranged to permit movement of the shoe anchored thereon, in a direction substantially radially of the brake, while the brake is applied.

8. A brake comprising a pair of articulated shoes, each having a central stiffening web, at least one of which has at an intermediate point in its length an opening extending through its web, and an anchor extending through said opening, said opening and said anchor being constructed and arranged to permit the shoe to slide radially thereon while the brake is applied.

9. A brake comprising a shoe having a cylindrical anchor bearing, an anchor arranged in said bearing and which has a flat side, and a planoconvex thrust member in said bearing with its flat side slidably engaging the flat side of the anchor and with its convex side rotatably engaging the inside of the bearing, the plane of the slidably engaging flat sides being at an acute angle to the radius of the brake passing through the center of the anchor.

LUDGER ELIZÉ LA BRIE.